United States Patent [19]

Sumimura et al.

[11] Patent Number: 4,696,970
[45] Date of Patent: Sep. 29, 1987

[54] METHOD FOR PRODUCING A SILICONE POLYMER-FILLER MIXTURE

[75] Inventors: Shin-ichi Sumimura; Akira Tazawa, both of Chiba, Japan

[73] Assignee: Toray Silicone Company, Ltd., Tokyo, Japan

[21] Appl. No.: 861,882

[22] Filed: May 12, 1986

[30] Foreign Application Priority Data

May 28, 1985 [JP] Japan .................. 60-114454

[51] Int. Cl.$^4$ ............................................. C08L 83/04
[52] U.S. Cl. ................................... 524/860; 524/430; 524/431; 524/413; 524/494; 524/495; 524/588; 524/789; 524/785; 524/788; 524/786; 524/783; 528/14; 528/18; 528/21; 528/23; 264/211.23
[58] Field of Search ............... 524/430, 431, 413, 494, 524/495, 588, 789, 785, 788, 780, 786, 783, 860; 528/14, 18, 21, 23; 264/211.23

[56] References Cited

U.S. PATENT DOCUMENTS

| 4,433,096 | 2/1984 | Bokerman et al. | 524/783 |
| 4,448,927 | 5/1984 | Falender et al. | 524/860 |
| 4,482,670 | 11/1984 | Saam et al. | 524/860 |
| 4,486,567 | 12/1984 | Bowman et al. | 524/863 |

FOREIGN PATENT DOCUMENTS 1325654 8/1973 United Kingdom .

Primary Examiner—Melvyn I. Marquis
Attorney, Agent, or Firm—Edward C. Elliott

[57] ABSTRACT

The present invention produces a silicone polymer-filler mixture by passing prescribed quantities of silicone oligomer, filler and polymerization catalyst through a continuous kneader extruder with kneading and polymerization of the silicone oligomer into silicone polymer. A homogeneous silicone polymer-filler mixture is rapidly produced in a single process with low energy consumption.

The silicone polymer-filler mixture produced by the present method is useful as a base for diverse silicone rubber compositions, silicone compounds and silicone greases, etc.

12 Claims, No Drawings

METHOD FOR PRODUCING A SILICONE POLYMER-FILLER MIXTURE

BACKGROUND OF THE INVENTION

1. Field of the Invention

The present invention describes a method for continuously producing a silicone polymer-filler mixture in a continuous kneader extruder.

2. Background Information

Silicone polymer-filler mixtures are used as a base for various silicone rubber compositions, silicone compounds and greases, etc. These mixtures are generally produced by first polymerizing silicone oligomer into a silicone polymer with the desired viscosity and then mechanically mixing the resulting silicone polymer with the selected filler. However, such methods require 2 different types of processes, necessitating a separate polymerization apparatus and mixing apparatus. As a result, the process is complicated and disadvantageous on a cost basis. In addition, it is difficult in such methods to mix and disperse filler into high-viscosity silicone polymers and large amounts of energy are consumed. This particular problem becomes significant when the molecular weight of the silicone polymer is as high as that of a so-called gum.

On the other hand, British Pat. No. 1,325,654 published Aug. 8, 1973, discloses a method in which a silicone polymer-filler mixture is produced by polymerization of organosiloxane oligomer in the presence of filler. However, this method is a batch process and suffers from the following problems: production of silicone polymer with the desired degree of polymerization requires a long time, the process is complicated and heterogeneous gel material is produced in the silicone polymer-filler mixture product.

U.S. Pat. No. 4,433,096, issued Feb. 21, 1984 to Bokerman, et al. teaches a method of polymerizing polydiorganosiloxane in the presence of filler, using basic diorganosilanolates as catalysts. The use of trifluoromethane sulfonic acid is taught in U.S. Pat. No. 4,448,927, issued May 15, 1984, to Falender, et al. The use of a catalytic amount of sulfuric or sulfonic acid is described in U.S. Pat. No. 4,482,670, issued Nov. 13, 1984 to Saam, et al. A mixture of quaternary ammonium carboxylate and carboxylic acid is disclosed in U.S. Pat. No. 4,486,567, issued Dec. 4, 1984 to Bowman, et al. None of these methods disclose a continuous method of producing a silicone polymer-filler mixture, but describe batch methods of production.

SUMMARY OF THE INVENTION

The present invention produces a silicone polymer-filler mixture by passing a mixture of silicone oligomer, filler, and polymerization catalyst through a continuous kneader extruder to polymerize the oligomer.

The object of the present invention is to eliminate the above-mentioned problems in prior methods for producing silicone polymer-filler mixtures by providing a method for producing a homogeneous silicone polymer-filler mixture using a very simple, rapid process with low energy consumption.

DESCRIPTION OF THE INVENTION

The object of this invention is achieved by a method for producing a silicone polymer-filler mixture, characterized in that a silicone polymer-filler mixture is produced by passing (A) 100 weight parts silicone oligomer selected from
(a) polydiorganosiloxane with the general formula

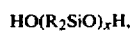

(b) polydiorganosiloxane with the general formula

and their mixtures, and optionally including
(c) polydiorganosiloxane with the general formula $R_3SiO(R_2SiO)_zSiR_3$, (d) polydiorganosiloxane with the general formula $R_3SiO(R_2SiO)_zH$ or their mixtures where each R is independently an unsubstituted or substituted monovalent hydrocarbon group, x is from 1 to 200 on average, y is from 3 to 10 on average, and z is from 0 to 50 on average,
(B) 1 to 150 weight parts filler; and
(C) a catalyst in a quantity sufficient to catalyst the polymerization of said silicone oligomer in the presence of said filler, through a continuous kneader extruder with polymerization of said silicone oligomer into silicone polymer.

By way of explanation, the silicone oligomer comprising component (A) is the starting material for the silicone polymer. This silicone oligomer consists of only
(a) polydiorganosiloxane with the general formula

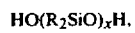

or only (b) polydiorganosiloxane with general formula

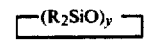

or of a mixture of polydiorganosiloxanes (a) and (b).

In the preceding general formulas, each R is independently an unsubstituted or substituted monovalent hydrocarbon group. The unsubstituted monovalent hydrocarbon groups are exemplified by alkyl groups such as methyl, ethyl, propyl and butyl; aryl groups such as phenyl, tolyl, xylyl and ethylphenyl; and alkenyl groups such as vinyl, allyl and 1-propenyl. The substituted monovalent hydrocarbon groups are exemplified by substituted alkyl groups such as chloromethyl, iodomethyl, bromomethyl, fluoromethyl, 2-chloroethyl, 2-iodoethyl, 2-bromoethyl, 2-fluoroethyl, 3-chloropropyl, 3,3,3-trifluoropropyl, chloroisobutyl, 2-phenylpropyl, 2-phenylethyl, 3-mercaptopropyl, mercaptoisobutyl and 2-cyanoethyl.

It is preferred that all R groups in the formulas for polydiorganosiloxanes (a) and (b) be methyl; otherwise, one R in each siloxane unit is methyl and the other R is a monovalent hydrocarbon group other than methyl. The average value for x in polydiorganosiloxane (a) is 1 to 200 and preferably 3 to 100 and the average value for y in polydiorganosiloxane (b) is 3 to 10 and preferably 3 to 6.

The silicone oligomer used in the present invention optionally additionally contains polydiorganosiloxane (c) with the general formula $R_3SiO(R_2SiO)_zSiR_3$, polydiorganosiloxane (d) with the general formula $R_3SiO(R_2SiO)_zH$, or their mixtures. In these formulas, each R is defined as above and z is from 0 to 50 on average. These polydiorganosiloxanes (c) and (d) are used to introduce end-blocking units with the general formula $R_3SiO_{0.5}$ into the silicone polymer product.

The quantity of addition of components (c) and (d) is determined from the average molecular weight desired for the silicone polymer in the final silicone polymer-filler mixture. The molecular weight of the silicone polymer in the final product declines with an increasing concentration of components (c) and (d) in the starting material. The optimal quantity of components (c) and (d) is most advantageously determined by experiments in order to accomplish the desired results; however, this quantity is generally small, for example, <5 weight parts per 100 weight parts of the combined quantity of components (a) and (b).

The filler comprising component (B), depending on the type, plays the role of thickener, reinforcer, extender or agent for imparting conductivity, etc. The filler may be a reinforcing filler such as fumed silica, precipitated silica, fumed titanium dioxide or carbon black; or an extending filler such as quartz powder, aluminum oxide, zirconium silicate, magnesium oxide, zinc oxide, talc, diatomaceous earth, iron oxide, calcium carbonate, clay, titanium dioxide, mica, glass powder or graphite.

The quantity of filler used depends on the type of filler and on the application of the silicon polymer-filler mixture. A strongly reinforcing filler such as fumed silica or precipitated silica will generally be employed at from 2 to 70 weight parts per 100 weight parts total polydiorganosiloxane. The highest reinforcing performance is obtained for this range of addition. Other fillers are used at from 1 to 150 weight parts per 100 weight parts total polydiorganosiloxane, but the optimal quantity is appropriately determined by experiment. The filler may be a single filler or 2 or more fillers may be used simultaneously.

Water present in the filler and silicone oligomer functions as an end-stopping agent for the silicone polymer and so must be carefully regulated.

The catalyst comprising component (C) is unrestricted as long as it can polymerize the polydiorganosiloxane oligomer in the presence of inorganic filler. When the inorganic filler used is an acid filler (a weight percent slurry in distilled water has a pH<7) or a neutral filler (pH is approximately 7), the use of an acid catalyst is preferred. Examples of said acid catalysts are sulfuric acid, sulfonic acids with the formula $XSO_3H$ (where X is selected from halogen, alkyl, aryl, alkoxy and alkaryl groups), perfluorinated alkanesulfonic acids, phosphoric acid, activated clay, and combinations of carboxylic acids and quaternary ammonium carboxylates.

Examples of acid and neutral fillers are carbon black, fumed silica, precipitated silica, diatomaceous earth, quartz powder, fumed titanium dioxide and glass powder.

When the filler is basic, the catalyst should be a basic catalyst. Examples of said basic catalysts are sodium hydroxide, potassium hydroxide, potassium dimethylsilanol and tetrabutylsulfonium dimethylsilanol. Examples of basic fillers are calcium carbonate, magnesium oxide and calcium silicate.

The quantity of catalyst used is unrestricted as long as it is sufficient to polymerize the polydiorganosiloxane oligomer to give the desired degree of polymerization, but this quantity should be as small as possible from the standpoints of economics and the stability of the silicone polymer-filler mixture. The preferred quantity of catalyst is 0.02 to 10 weight parts and preferably 0.02 to 5 weight parts per 100 weight parts total polydiorganosiloxane.

The use of a continuous kneader extruder is the most important element in the present invention and is an essential factor. It is the use of such a device which, for the first time, eliminates the problems residing in the prior art technologies as discussed above.

The continuous kneader extruder used in the present invention provides for a continuous kneading and extrusion by using a kneading element-equipped screw, and is selected from among single-screw and multi-screw extruders such a Ko-Kneaders. Multi-screw extruders are preferred with twin-screw extruders most preferred. In these twin-screw extruders, two co-rotating or counter-rotating screws are installed parallel to each other in the barrel and a feed opening or openings for polydiorganosiloxane oligomer, filler and catalyst are installed at the head of the rear zone when considered longitudinally. Three feed openings may be present for the separate supply of polydiorganosiloxane oligomer, filler and catalyst; alternatively, 1 or 2 feed openings may be installed for joint use. As necessary, 1 or more vents are installed in the kneading zone subsequent to the above-mentioned feed opening(s).

The two screws may be single-flight, double-flight or triple-flight screws and they may be intermeshing or non-intermeshing. The instant continuous kneader extruder advantageously has a heating means in the downstream half when considered longitudinally. As desired, 2 or more continuous kneader extruders may be connected in series in the present invention. In this case, the machines connected to each other may be the same or of a different type.

Silicone oligomer, filler and catalyst, supplied into the barrel from the feed opening or openings, are mixed by the rotation effect of the rotating screw or screws while being transferred in the direction of the discharge outlet. At the same time, the silicone oligomer is catalytically polymerized to a higher molecular weight. The polymerization of the silicone oligomer proceeds rapidly in the heated zone.

The barrel temperature and residence time in the barrel are both the minimum values which give the desired degree of polymerization in the silicone polymer in order to achieve advantageous economics. The downstream half (considered longitudinally) of the continuous kneader extruder should be maintained at from 50° to 200° C. and the residence time in the barrel should be regulated at from 1 minute to 1 hour.

The rate of screw rotation will depend on the type of continuous kneader extruder used, but it should be high in order to achieve an excellent filler dispersion and to prevent the production of heterogeneous gel. The rate of screw rotation is generally 10 to 500 rpm and preferably 100 to 400 rpm.

The silicone polymer-filler mixture produced by the above-described method is useful as a base for silicone rubber compositions, silicone compounds and silicone greases. To produce a milling-type silicone rubber composition, organoperoxide is added to a mixture of silicone polymer gum and reinforcing filler, with mixing to homogeneity. Appropriate organoperoxides are known and examples thereof are benzoyl peroxide, 2,4-dichlorobenzoyl peroxide, di-t-butyl peroxide, 2,5-bis(t-butylperoxy)-2,5-dimethylhexane, dicumyl peroxide, t-butyl perbenzoate and p-chlorobenzoyl peroxide.

When the silicone polymer-filler mixture is to be used for a condensation-curing organopolysiloxane composition, crosslinker and possibly curing catalyst are added and mixed into a mixture of filler and hydroxyl-terminated polydiorganosiloxane as the silicone polymer. The filler is a reinforcing filler, extender filler or mixture of such fillers. The crosslinker is a trifunctional saline, tetrafunctional silane or polyfunctional polysiloxane oligomer. Typical examples of the silicon-bonded functional groups are the acetoxy, alkoxy, diorganoamino, ketooxime and acylamino groups. Examples of the optional curing catalysts are metal carboxylates, alkylmetal carboxylates, alkylmetal alkoxides and organotitanates. Among these catalysts, stannous octanoate, dibutyltin diacetate, dibutyltin dilaurate, tetrabutyl titanate, dibutyltin dimethoxide and tetraisopropyl titanate are preferred. When the silicone polymer-filler mixture is to be used in an addition-curing silicon rubber composition, a mixture of filler and straight-chain silicone polymer containing at least 2 monovalent substituted aliphatic groups (for example, vinyl and allyl) in each molecule is combined and mixed with a polyorganohydrogensiloxane containing in excess of 2 silicon-bonded hydrogen atoms per molecule, and with a very small amount of a platinum-containing catalyst. Small amounts of additives may be added to the silicon polymer-filler mixture in order to improve the thermal stability, workability, storage stability, compression set, oil resistance or flame retardancy or in order to color the mixture.

EXAMPLES

The present invention will be explained using examples of execution, but is not limited to the examples. "Parts" in the examples is "weight parts" and the viscosity is measured at 25° C. The molecular weight of the silicone polymer in the produced silicone polymer-filler mixture is measured as follows. Approximately 1 g of the mixture is shaken with 12 g toluene and 12 g aqueous ammonia for 24 hours. The filler is removed from the toluene layer by centrifugation. The toluene layer is collected by decantation and the toluene is then evaporated. The residue is dissolved in toluene to give a residue content of 1 weight percent. The weight average molecular weight is then determined by gel permeation chromatography.

The physical properties of the silicone rubber test specimens are measured by the methods of JIS K6301.

EXAMPLE 1

A silicon-polymer-filler mixture was prepared by feeding 80 weight percent hydroxyl-terminated polydimethylsiloxane with a degree of polymerization of approximately 35 (weight average molecular weight of approximately 2600), 20 weight percent fumed silica with a specific surface of 200 m$^2$/g, 0.2 weight percent hydroxyl-terminated polymethylvinylsiloxane with a degree of polymerization of approximately 10, and 0.03 weight percent trifluoromethanesulfonic acid to the feed opening at the rear of a twin-screw continuous kneader extruder (screw diameter (D), 50 mm; screw length (L), 450 mm; with two co-rotating double-flight screws). Cooling water is injected into extruder's L/D equal to 1 to 4 zone in order to maintain the temperature below or equal to 40° C. The L/D equal to 5 to 9 zone was heated to 150° C. The screw rpm was 300 rpm and the residence time of the mixture was 3 minutes. A silicone polymer-filler mixture was discharged at the discharge outlet installed at the terminal. The produced mixture was a homogeneous plastic solid which did not contain gel material. The mixture can be easily milled on a 2-roll. The molecular weight of the silicone polymer in the mixture was 257,000. Then 100 parts of the just discharged mixture was combined with 0.3 parts magnesium oxide using a 2-roll in order to neutralize the polymerization catalyst, and 0.5 Parts 2,5-bis(t-butylperoxy)-2,5-dimethylhexane was mixed into the resulting mixture; followed by press-vulcanizing at 170° C. for 10 minutes and then secondary vulcanizing in a hot air circulation oven at 200° C. for 4 hours to produce a silicone rubber test specimen. The physical properties of the produced test specimen were measured and the results are reported in Table 1.

EXAMPLE 2

A silicone polymer-filler mixture was produced as described in Example 1, but by continuously supplying 75 weight percent of the hydroxyl-terminated polydimethylsiloxane, instead of 80 weight percent, and 25 weight percent of the fumed silica instead of 20 weight percent. The produced mixture was a homogeneous plastic solid. The molecular weight of the silicone polymer in the mixture was 202,000. A silicone rubber test specimen was produced as described in Example 1 using 1.0 part 2,4-dichlorobenzoyl peroxide, instead of 0.5 parts 2,5-bis-(t-butylperoxy)-2,5-dimethylhexane, and press-vulcanizing at 120° C. for 10 minutes, instead of at 170° C. for 10 minutes. The physical properties of the produced silicon rubber test specimen were measured and the results are reported in Table 1.

EXAMPLE 3

A mixture of 80 weight percent hydroxyl-terminated polydimethylsiloxane, 20 weight percent fumed silica with a specific surface of 200 m$^2$/g, 0.5 weight percent tetramethyldivinyldisiloxane and 0.5 weight percent concentrated sulfuric acid were all continuously supplied to the feed opening of the twin-screw continuous kneader extruder described in Example 1. Cooling water was injected into the L/D equal to 1 to 4 zone to maintain the temperature at below 30° C. The L/D equal to 5 to 9 zone was heated at 170° C. The rate of screw rotation was 300 rpm and the residence time of the mixture was 8 minutes. The silicone polymer-filler mixture was discharged from the discharge outlet at the terminal as a homogeneous paste. The molecular weight of the silicone polymer was 42,000. Each 100 parts of the produced silicone polymer-filler mixture was mixed in a household blender with 2 parts magnesium oxide in order to neutralize the polymerization catalyst. The resulting mixture was combined and mixed with 1 part methylhydrogenpolysiloxane with a viscosity of 7 cP and containing 0.80 weight percent silicone-bonded hydrogen atoms, and with a chloroplatinic acid-methylvinylsiloxane complex (15 parts per million as the weight of platinum based on the weight of silicone polymer) and this was then cured at 150° C. for 5 minutes to produce a rubber test specimen. The physical properties were then measured and the results are reported in Table 1.

EXAMPLE 4

A mixture of 70 weight percent hydroxyl-terminated polydimethylsiloxane with a molecular weight of approximately 2600, 30 weight percent precipitated silica with a specific surface of 230 m$^2$/g, 0.3 weight percent hydroxyl-terminated polymethylvinylsiloxane with a degree of polymerization of approximately 10, 0.2 weight percent dimethylvinylsiloxy-terminated polydimethylsiloxane with a degree of polymerization of approximately 5, and 0.3 weight percent trifluoromethanesulfonic acid was continuously supplied to the feed opening of the twin-screw continuous kneader extruder used in Example 1. The L/D equal to 1 to 4 zone of said extruder was maintained at below about 30° C. and the L/D equal to 5 to 9 zone was heated to 170° C. The rate of screw rotation was 300 rpm and the residence time of the mixture was 7 minutes. The silicone polymer-filler mixture was discharged from the discharge outlet at the terminal. The produced mixture was a homogeneous plastic solid and could be easily milled using a 2-roll. The molecular weight of the silicone polymer in the mixture was 338,000. A rubber test specimen was produced as described in Example 1, its physical properties were measured, and the results are reported in Table 1.

EXAMPLE 5

A mixture of 90 weight percent of the hydroxyl-terminated polydimethylsiloxane described in Example 1, 10 weight percent fumed silica with a specific surface of 200 m$^2$/g, and 0.6 weight percent dodecylbenzenesulfonic acid were all continuously supplied to the feed opening of the twin-screw continuous kneader extruder used in Example 1. The L/D equal to 1 to 4 zone of said extruder was maintained at below about 30° C. and the L/D equal to 5 to 9 zone was maintained at 90° C. The rate of screw rotation was 300 rpm and the residence time of the mixture was 7 minutes. A silicone polymer-filler mixture was discharged from the discharge outlet at the terminal; it was a homogeneous paste. The molecular weight of the silicone polymer in the mixture was 51,000. Then 100 parts of the produced mixture was combined with 0.5 parts diethylamine in order to neutralize the polymerization catalyst and this was then combined and mixed with 10 parts of a mixture of 100 parts methyltriacetoxysilane and 1 part dibutyltin diacetate under tightly sealed conditions to produce a silicone rubber composition. The produced mixture was stable during storage under sealed conditions. When the produced mixture was exposed to moisture at room temperature, it cured into a silicone rubber. The physical properties were measured on a silicone rubber test specimen which had been allowed to stand and cure in the ambient at 25° C./RH 50% for 7 days. The results are reported on Table 1.

EXAMPLE 6

A mixture of 77 weight percent of a polydimethylcyclosiloxane with an average degree of polymerization of approximately 4, 23 weight percent fumed silica with a specific surface of 380 m$^2$/g, and 0.5 weight percent concentrated sulfuric acid were all continuously supplied to the feed opening of the twin-screw continuous kneader extruder used in Example 1. The L/D equal to 1 to 4 zone of said extruder was maintained at below about 30° C. and the L/D equal to 5 to 9 zone was maintained at 170° C. The rate of screw rotation was 300 rpm and the residence time of the mixture was 8 minutes. A silicone polymer-filler mixture was discharged from the discharge outlet at the terminal; it was a homogeneous plastic solid and could be easily milled using a 2-roll. The molecular weight of the silicone polymer in the mixture was 224,000. Then 2 parts hexamethyldisilazane was added to each 100 parts of the produced mixture in order to deactivate the catalyst; and this was then heated at 150° C. for 2 hours in order to remove the volatiles. Then 1.5 parts 2,4-dichlorobenzoyl peroxide was added and mixed into the resulting mixture and this was then press-vulcanized at 120° C. for 10 minutes and then secondarily vulcanized at 200° C. for 4 hours to produce a silicone rubber test specimen. The specimen's physical properties were then measured and the results are reported in Table 1.

TABLE 1

| Example | 1 | 2 | 3 | 4 | 5 | 6 |
|---|---|---|---|---|---|---|
| hardness | 33 | 48 | 35 | 52 | 18 | 45 |
| tensile strength (kg/cm$^2$) | 75 | 73 | 66 | 70 | 25 | 67 |
| elongation (percent) | 503 | 250 | 343 | 245 | 485 | 375 |
| tear strength (JIS-A, kg/cm) | 16 | 8 | 9 | 8 | 5 | 9 |

COMPARISON EXAMPLE

A kneader mixer was loaded with 800 parts hydroxyl-terminated polydimethylsiloxane with a degree of polymerization of approximately 35 (weight average molecular weight of approximately 2600), 200 parts fumed silica with a specific surface of 200 m$^2$/g, 2 parts hydroxyl-terminated polymethylvinylsiloxane, and 0.3 parts trifluoromethanesulfonic acid and kneaded with each other for 30 minutes and then heated to 150° C. and polymerized at 150° C. for 2 hours. The mixture become powdery during polymerization and a large amount of gel material was observed. The molecular weight of the silicone polymer in the produced silicone polymer-filler mixture was 187,000.

The physical properties were measured on a silicone rubber test specimen produced from the above-mentioned mixture under the conditions described in Example 1. The hardness was 33, the tensile strength was 41 kg/cm$^2$, the elongation was 185 percent and the tear strength was 10 kg/cm, all inferior to the physical properties of the silicone rubber produced in Example 1.

EXAMPLE 7

Feed streams of 92 weight percent of the hydroxyl-terminated polydimethylsiloxane described in Example 1, 1.2 weight percent trimethylsiloxy-terminated polydimethylsiloxane with an average molecular weight of 530, 4.8 weight percent fumed silica with a specific surface of 200 m$^2$/g and 2 weight percent dodecylbenzenesulfonic acid were all continuously supplied to the feed opening of the twin-screw continuous kneader extruder used in Example 1. All of said extruder was maintained at about or below 30° C. and the residence time of the mixture was 5 minutes. A homogeneous grease mixture was discharged from the discharge outlet. To 100 parts of the produced mixture was added 1.7 parts diethylamine in order to neutralize the catalyst. The molecular weight of the silicone polymer in the mixture was measured at 78,000. The cone penetration as measured by the method of JIS K2220 was 300 and oil separation was 9.5 percent at 200° C. in 24 hours. The grease mixture is useful as a mold-release grease.

That which is claimed is:

1. Method for producing a silicone polymer-filler mixture, characterized in that a silicone polymer-filler mixture is produced by passing (A) 100 weight parts siloxane oligomer selected from the group consisting of (a) polydiorganosiloxane with the general formula $$HO(R_2SiO)_xH,$$

(b) polydiorganosiloxane with the general formula $$(R_2SiO)_y$$

and their mixtures, where each R is independently an unsubstituted or substituted monovalent hydrocarbon group, x is from 1 to 200 on average and y is from 3 to 10 on average, (B) 1 to 150 weight parts filler; and (C) a catalyst in a quantity sufficient to catalyze the polymerization of said silicone oligomer in the presence of said filler, through a continuous kneader extruder with polymerization of said silicone oligomer into silicone polymer.

2. The method of claim 1 in which R is a methyl group.

3. The method of claim 1 in which x is 3 to 100 and y is 3 to 6.

4. The method of claim 1 in which the continuous kneader extruder is a twin-screw extruder.

5. The method of claim 1 in which the filler is from 2 to 70 weight parts of reinforcing filler and the catalyst is from 0.02 to 5 weight parts of perfluorinated alkane sulfonic acid per 100 weight parts total polydiorganosiloxane.

6. The method of claim 1 in which the filler is from 2 to 70 weight parts of reinforcing filler and the catalyst is from 0.02 to 5 weight parts of sulfonic acid of the formula $XSO_3H$, where X is selected from halogen, alkyl, aryl, alkoxy, and alkaryl groups.

7. The method of claim 1 in which siloxane oligomer (A) also contains less than 5 weight parts per each 100 weight parts of the combined quantities of (a) and (b) of a siloxane oligomer selected from the group consisting of (c) polydiorganosiloxane with the general formula $$R_3SiO(R_2SiO)_zSiR_3,$$

(d) polydiorganosiloxane with the general formula $$R_3SiO(R_2SiO)_zH$$

or their mixtures, wherein each R is as defined in claim 1 and z is from 0 to 50 on average.

8. The method of claim 7 in which R is a methyl group.

9. The method of claim 8 in which x is 3 to 100 and y is 3 to 6.

10. The method of claim 9 in which the continuous kneader extruder is a twin-screw extruder.

11. The method of claim 10 in which the filler is from 2 to 70 weight parts of reinforcing filler and the catalyst is from 0.02 to 5 weight parts of perfluorinated alkane sulfonic acid per 100 weight parts total polydiorganosiloxane.

12. The method of claim 10 in which the filler is from 2 to 70 weight parts of reinforcing filler and the catalyst is from 0.02 to 5 weight parts of sulfonic acid of the formula $XSO_3H$, where X is selected from halogen, alkyl, aryl, alkoxy, and alkaryl groups.

* * * * *

UNITED STATES PATENT AND TRADEMARK OFFICE
CERTIFICATE OF CORRECTION

PATENT NO. : 4,696,970
DATED : September 29, 1987
INVENTOR(S) : Shin-Ichi Sumimura and Akira Tazawa It is certified that error appears in the above-identified patent and that said Letters Patent is hereby corrected as shown below:

Column 5, line 31, delete "substituted" and replace with ---unsaturated---.

Column 8, line 43, delete "become" and replace with ---became---.

Signed and Sealed this

Fourteenth Day of June, 1988

*Attest:*

DONALD J. QUIGG

*Attesting Officer*     *Commissioner of Patents and Trademarks*